(12) United States Patent
Augé et al.

(10) Patent No.: US 12,120,186 B1
(45) Date of Patent: Oct. 15, 2024

(54) IN PATH EDGE RELAY INSERTION

(71) Applicant: Cisco Technology, Inc., San Jose, CA (US)

(72) Inventors: Jordan Augé, Saint-Cyr-l'Ecole (FR); Michele Papalini, Issy les Moulineaux (FR); Mauro Sardara, Issy les Moulineaux (FR); Luca Muscariello, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/363,415

(22) Filed: Aug. 1, 2023

(51) Int. Cl.
*H04L 67/148* (2022.01)
*H04L 67/1038* (2022.01)
*H04L 67/141* (2022.01)

(52) U.S. Cl.
CPC ........ *H04L 67/148* (2013.01); *H04L 67/1038* (2013.01); *H04L 67/141* (2013.01)

(58) Field of Classification Search
CPC . H04L 67/148; H04L 67/1038; H04L 67/141; H04L 67/10
See application file for complete search history.

(56) References Cited

U.S. PATENT DOCUMENTS

| | | | |
|---|---|---|---|
| 11,418,582 B1 * | 8/2022 | Swain | H04L 67/145 |
| 11,573,839 B1 | 2/2023 | Tsai et al. | |
| 2018/0020064 A1 * | 1/2018 | Milanese | H04L 67/52 |
| 2021/0092188 A1 | 3/2021 | Guo et al. | |
| 2021/0096936 A1 * | 4/2021 | Seshadri | G06F 9/30079 |
| 2021/0382761 A1 | 12/2021 | Bai et al. | |
| 2022/0327007 A1 * | 10/2022 | Adogla | C07K 16/2818 |
| 2023/0026671 A1 | 1/2023 | Seed et al. | |
| 2023/0133380 A1 * | 5/2023 | Kreger-Stickles | H04L 41/08 709/220 |
| 2024/0113971 A1 * | 4/2024 | Goliya | H04L 45/02 |

OTHER PUBLICATIONS

Maheshwari et al., "Traffic-Aware Dynamic Container Migration for Real-Time Support in Mobile Edge Clouds", WINLAB, Rutgers University, North Brunswick, NJ, USA, 2018 IEEE International Conference on Advanced Networks and Telecommunications Systems (ANTS), downloaded on Jun. 13, 2023 from IEEE Xplore, 6 pages.

* cited by examiner

*Primary Examiner* — David R Lazaro
(74) *Attorney, Agent, or Firm* — Baker Botts L.L.P.

(57) ABSTRACT

The present disclosure describes systems and methods for migrating communications between a client device and an application hosted by a cloud server. The method includes receiving from an edge server a signal from a client device requesting the establishment of a new communication path between the client device and the cloud server through the edge server. A first connection between client device and the edge server is established, and a second connection between the edge server and cloud server is also established. Once the connections are established, the communication between the client device and the application is migrated from a direct connection between the client device and cloud server to the first and second connections.

20 Claims, 6 Drawing Sheets

IN PATH EDGE RELAY INSERTION

TECHNICAL FIELD

The present disclosure relates generally to a distributed cloud environment that includes a plurality of edge servers and, more particularly, to systems and methods for migrating a client device from a cloud server to an edge server.

BACKGROUND

Organizations in the recent past have increasingly utilized cloud environments to provide some or all their computing needs. The use of a cloud environment provides for massive rewards of visibility, elasticity, agility, flexibility, scale, security, and cost effectiveness. However, organizations have now begun to bring at least some computing back to a more local environment, such as the so-called edge computing environment. An edge computing environment comprises a plurality of edge servers, which allows some computing to be performed closer to the end users or organization while still having some of the benefits of the cloud environment. The edge computing environment overcomes some of the deficiencies with cloud environments, such as bandwidth, latency, regulatory and/or privacy concerns. However, selecting and migrating to an edge server or node to offload cloud resources to is not a trivial matter, especially when the resources are related to real-time communications such as live media distribution and/or video conferencing.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems and components depicted in the accompanying figures are not to scale and components within the figures may be depicted not to scale with each other.

DESCRIPTION OF EXAMPLE EMBODIMENTS

Overview

One or more embodiments comprise a method for migrating a communication between a client device and an application hosted by a cloud server. A signal requesting an establishment of a new communication path between the client device and the cloud server through the edge server is received by an edge server from the client device. After the edge server receives the signal, the edge server forwards the signal to the cloud server. A first connection between the client device and edge server and a second connection between the edge server and the cloud server are established. A control plane associated with the application and the edge server establishes a new communication path between the cloud server and client device using the first and second connections. Once this communication path is established, the communication is migrated to the new communication path.

This disclosure additionally describes a system that comprises a client device that uses an application, a cloud server which hosts the application, and an edge server. The edge server further includes one or more processors and one or more computer-readable non-transitory storage media coupled to the one or more processors that stores instructions operable when executed by the one or more processors to cause the system to perform a method. The method includes receiving a signal by the edge server from the client device. The signal requests the establishment of a new communication path between the client device and the cloud server through the edge server. After the edge server receives the signal, the edge server forwards the signal to the cloud server. A first connection between the client device and edge server and a second connection between the edge server and the cloud server are then established. A control plane associated with the application and the edge server establishes a new communication path between the cloud server and client device using the first and second connections. Once this communication path is established, the communication is migrated to the new communication path.

This disclosure also describes at least one non-transitory computer-readable storage medium having stored instructions. When the instructions are executed by one or more processors, the instructions cause the processors to have the edge server receive a signal from the client device requesting an establishment of a new communication path between the client device and the cloud server through the edge server. After the edge server receives the signal, the edge server forwards the signal to the cloud server. A first connection between the client device and edge server and a second connection between the edge server and the cloud server are established. A control plane associated with the application and the edge server establishes a new communication path between the cloud server and client device using the first and second connections. Once this communication path is established, the communication is migrated to the new communication path.

Certain systems and methods described herein may allow for migrating communication between a client device and an application or other resource hosted by a cloud server or edge server to a new edge server. The new edge server acts as either a relay between the client device and the cloud server or a host for providing one or more resources such as an application being provided to the client device. By utilizing a connection established between the client device and an edge server acting as a relay, instead of a direct connection to the cloud server, better performance may be achieved while potentially decreasing the amount of cloud-based resources that need to be used.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

The present disclosure describes an approach that allows for efficiently utilizing available edge servers to provide resources that have previously been provided from cloud servers in a distributed cloud environment. The distributed cloud environment allows an organization to utilize a hybrid combination of traditional cloud servers and edge servers to provide resources and subsequently manage them as a unified system. However, migrating communication from a direct path between the client device and a cloud server to a path that utilizes an edge server as a relay, especially for real-time applications, such as video conferencing, remains a challenge. The present disclosure seeks to address this by introducing an optimal method for migrating the communication between a client device and an application hosted by a cloud server to a communication path that includes an edge server functioning as a relay.

Realtime video conferencing, as well as similar real-time applications, generate significant traffic loads due to the large size of video data. At the same time, because of being real-time, interruptions or delays in the traffic are not well tolerated. Leveraging the use of edge servers as relays in a video conferencing system may lead to large bandwidth and computational savings in the cloud. This also allows the cloud servers to be able to serve a larger number of users while guaranteeing a given quality of experience (QoE).

One of the benefits of leveraging edge servers is that traffic from the media bridge (often deployed in the cloud) may be reduced since edge servers act as intermediate media switching nodes (relays), distributing media flows to connected client devices. However, use of edge servers as relays in real-time media communications is still in its infancy. Migrations from a direct connection to a relay edge server often result in interruptions in the communication between the client device and the application hosted on the cloud server. Further, a large among of signaling may need to take place between the client device and each of the edge servers and cloud servers to perform the migration, further using expensive cloud resources as well as network resources.

The present disclosure attempts to overcome these and other issues by utilizing the communication paths between the client device and edge server, as well as between the edge server and cloud server for forwarding and processing all signaling between the client device and the cloud server. This reduces the amount of signaling that needs to take place between the client device and the cloud server. Further, the communication is only migrated once it is verified that the new path through the edge server has been established and is functioning adequately, ensuring limited or no interruption in the communication.

The various aspects may be implemented in many different forms and should not be construed as limited to the implementations set forth herein. The disclosure encompasses variations of the embodiments as described herein, and like numbers refer to like elements throughout.

Figure 1:
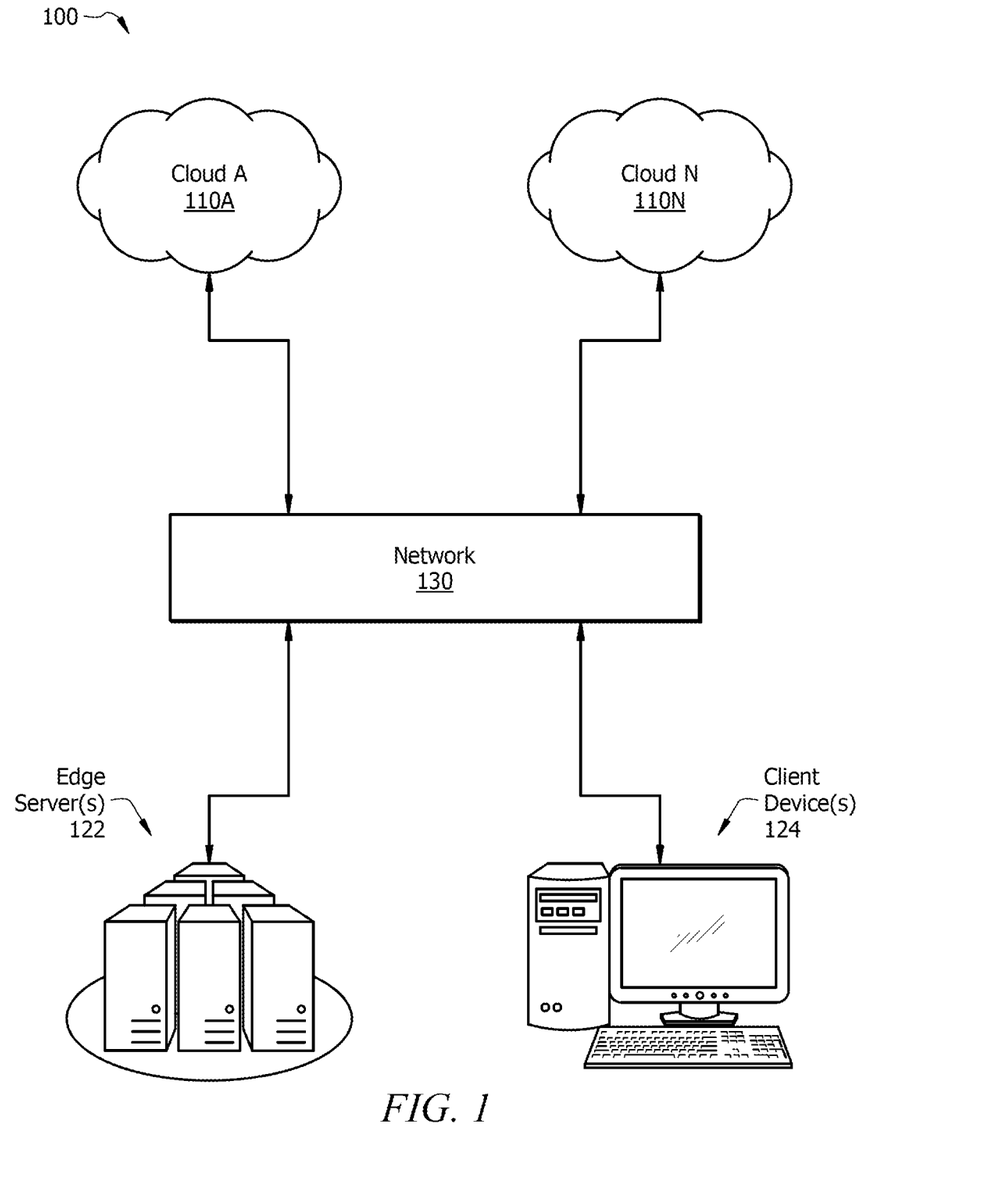
FIG. 1 illustrates a system diagram of a network architecture for performing one or more embodiments.

FIG. 1 illustrates a system diagram of an example system for providing resources from one or more cloud servers to one or more client devices according to some aspects of the current disclosure. FIG. 1 further illustrates a distributed cloud environment 100. The distributed cloud environment 100 includes a system architecture that includes two or more cloud servers 110A-110N, edge servers 122, and client devices 124. The distributed cloud environment 100 may include more or less devices than that shown in FIG. 1. The system further includes a network 130 that connects the cloud servers 110A-110N, edge servers 122, and client devices 124. Each of these may be virtual and/or one or more may be implemented by a stand-alone server or computational device configured to execute one or more stored instructions, such as that described with regards to FIG. 4.

In some examples, the network 130 may include devices housed or located in one or more of the edge servers 122, client devices 124, and/or the cloud servers 110A-110N. The network 130 may include one or more networks implemented by any viable communication technology, such as wired and/or wireless modalities and/or technologies. The network 130 may include any combination of personal area networks (PANs), local area networks (LANs), campus area networks (CANs), metropolitan area networks (MANs), extranets, intranets, the Internet, short-range wireless communication networks (e.g., ZigBee, Bluetooth, and/or Wide Area Networks (WANs))—both centralized and/or distributed—and/or any combination permutation, and/or aggregation thereof. The network 130 may include devices, virtual resources, or other nodes (including other edge servers 122) that relay packets from one network segment to another by nodes in the computer network. The network 130 may include multiple devices that utilize the network layer (session layer, transport layer, and/or other layer) in the OSI model for packet forwarding, and/or other layers. The network 130 may include various hardware devices, such as routers, switches, gateways, network interfaces (NICs), application specific integrated circuits (ASICs), field-programmable gate arrays (FPGAs), servers, and/or any other type of devices. Further, the network 130 may include virtual resources, such as virtual machines (VMs), containers, and/or other virtual resources. Additionally, or alternately, the techniques described herein are applicable to container technology, such as Docker®, Kubernetes®, and so forth.

The one or more cloud servers 110A-110N may be part of one or more data centers or environments comprising a plurality of cloud servers that are located or hosted externally to the organization. The cloud servers 110A-110N may provide data storage, computing power, or other resources through interaction between the one or more clouds servers and the client devices 124. The services hosted by the cloud servers are often provided on an on-demand basis, and a variety of tiers of service may be provided that may be reconfigured on demand as needed. This allows the organization to have agility in responding to changing needs and to efficiently use available resources, at least from an economic and energy use perspective. For example, in a non-limiting example, a cloud server 110A may host a database associated with an under-utilized product. However, due to advertising or other reasons, the product becomes popular. With a cloud environment, the organization may quickly reconfigure or purchase additional computing capacity to handle the additional data and interactions with the database. When the product is no longer popular, the extra capacity may easily be removed or re-dedicated to another product as needed.

This flexibility is an advantage of cloud environments. Further, depending on availability or capabilities, an organization may choose to use a plurality of different cloud servers 110A-110N that may or may not be from different cloud service providers to host various services/data in environments that meet geographical needs, security needs, and performance needs. Because of centralization, as well as scale, cloud service providers may devote resources to solving issues that many customers cannot afford and/or have the ability to implement locally. However, because the cloud servers 110A-110N may be geographically located far away from the organization and because cloud installations may be complex and expensive, alternatives to the cloud environment are often needed.

One such alternative is an edge computing environment comprising one or more edge servers 122. Edge servers 122, much like cloud servers, e.g., 110A, may be part of one or more datacenters or environments. However, unlike cloud servers, the edge servers are generally located in an organization's datacenter or in small deployments near potential customers. The one or more edge servers 122 may be physical facilities or buildings located across geographic areas that are designated to store networked services that are part of the network 130. The edge servers 122 may include various networking devices, as well as redundant or backup components and infrastructure for power supply, data communications connections, environmental controls, and various security devices. The edge servers may take the form of one or more computing devices as described in more detail below with regards to FIG. 4. Generally, the edge servers 122 may provide basic resources such as processor (CPU), memory (RAM), storage (disk), and networking (bandwidth).

Because the edge servers are located in an organization's own datacenters or at least nearer to the end users, they may often provide better latency than that of third-party cloud environments, e.g., 110A, which may only have a limited number of servers providing a resource for a large geographical area. For example, there may be only one or two cloud servers, e.g., 110A, or datacenters providing resources to an entire continent, while edge servers 122 might be located in each country or even in each major city. This provides better latency since the communications between client devices 124 and edge servers 122 do not need to travel as far. Further, edge servers 122 often have dedicated high speed connections to the specific cloud servers 110A-110N, which is different than what a client device 124 typically communicates with. Even if a resource is ultimately being provided by a server located in the one or more cloud servers 110A-110N, by having the client device 124 connect to the edge server 122 that is functioning as a relay rather than directly to a cloud server, e.g., 110A, faster provisioning of the resource may occur.

A client device 124 may provide a user, such as an administrator and/or customer, access to one or more resources through the edge server 122 and/or directly from the one more cloud servers 110A-110N. A client device 124 may be any computational device, such as those described with regards to FIG. 4 below. The client device 124 may be connected to the cloud servers 110A-N and/or edge servers 122 through the network 130. The client device 124 may be located in the same city or location as one or more of the edge servers 122, and/or one or more cloud servers, e.g., 110A. Alternatively, the client device 124 may be located in a separate geographical location that is different than that of either or both the edge servers 122, and/or one or more cloud servers, e.g., 110A. The client device 124 may be an end-user's device, such as a personal computer, smart phone, lap-top, smart TV, or other personal device. Alternatively, or in addition, the client device 124 may be part of a datacenter or other commercial deployment, and the client device 124 may be a terminal or other computational device associated with a business, enterprise, or other entity. The client device may take the form of an electronic device such as that described in more detail with regards to FIG. 4.

In one or more embodiments, the client device 124 is initially connected to one or more cloud servers, e.g., 110A, either directly or through an edge server 122. After some time, the client device 124 is migrated or associated with a new edge server 122 (or an initial edge server) in order to provide improved services and/or reduced costs. The method of migrating or associating the client device with an edge server 122 is described next with regards to FIGS. 2A, 2B, 2C, and 3.

Figure 2A:
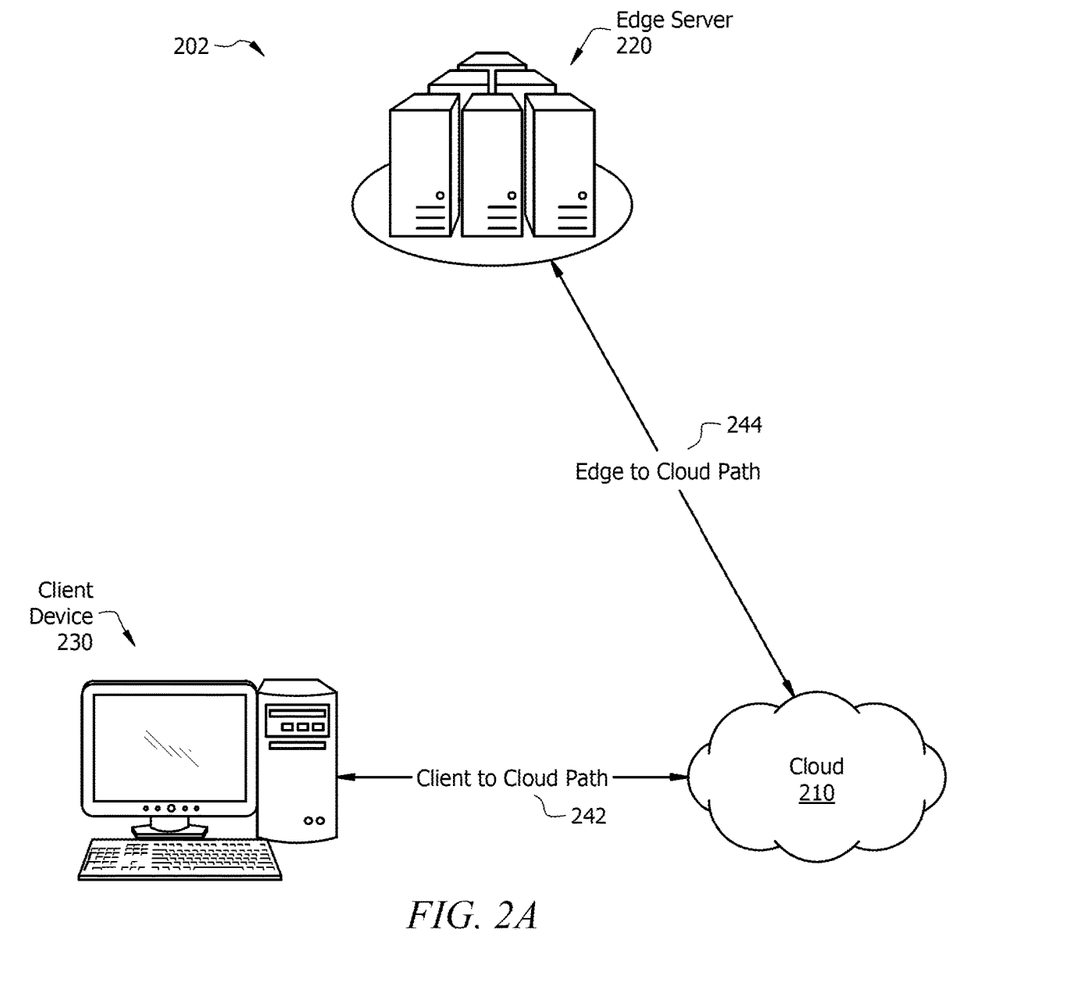
FIGS. 2A-2C illustrate the connections between a client device, a cloud server, and an edge server during the various steps of migrating the client device in accordance with at least one embodiment.

FIG. 2A shows a non-limiting example of the connections that are initially present in a system 202 prior to the migration of communication between a client device 230 with an application or other resource hosted by a cloud server 210. In one or more embodiments, initially the client device 230 communicates directly with the cloud servers 210 over a client to cloud path 242. This path is bi-directional and allows communication from both the cloud server 210 to the client device 230 and from the client device 230 to the cloud server 210. The communications may be controlled by an application control plane associated with the application and/or other management or control module hosted by either the cloud server 210 or edge server 220. The cloud server 210 initially hosts the application or other resource being provided to the client device 230. The client to cloud path 242 may utilize any network such as the Internet or another type of network, such as, but not limited to, PANs, LANs, CANs, MANs, extranets, intranets, the Internet, and/or short-range wireless communication networks (e.g., ZigBee, Bluetooth, or WANs). The path may travel a significant amount of distance and may travel through one or more switches, routers, relays, and other networking components.

Additionally, a second path, an edge to cloud path 244, may exist between an edge server 220 and the cloud server 210. This edge to cloud path 244 may also use PANs, LANS, CANs, MANs, extranets, intranets, the Internet, and/or short-range wireless communication networks. In general, it is desirable that the edge to cloud path 244 have better performance than that of the client to cloud path 242, but the disclosure is not limited to this configuration. The edge to cloud path 244 may be established after the edge server 220, cloud server 210, and/or application control plane determines that a migration is needed or should be performed, and the initial state may not include the edge to cloud path 244 prior to the edge server receiving a signal from the client device requesting the establishment of a new communication path.

Figure 2B:
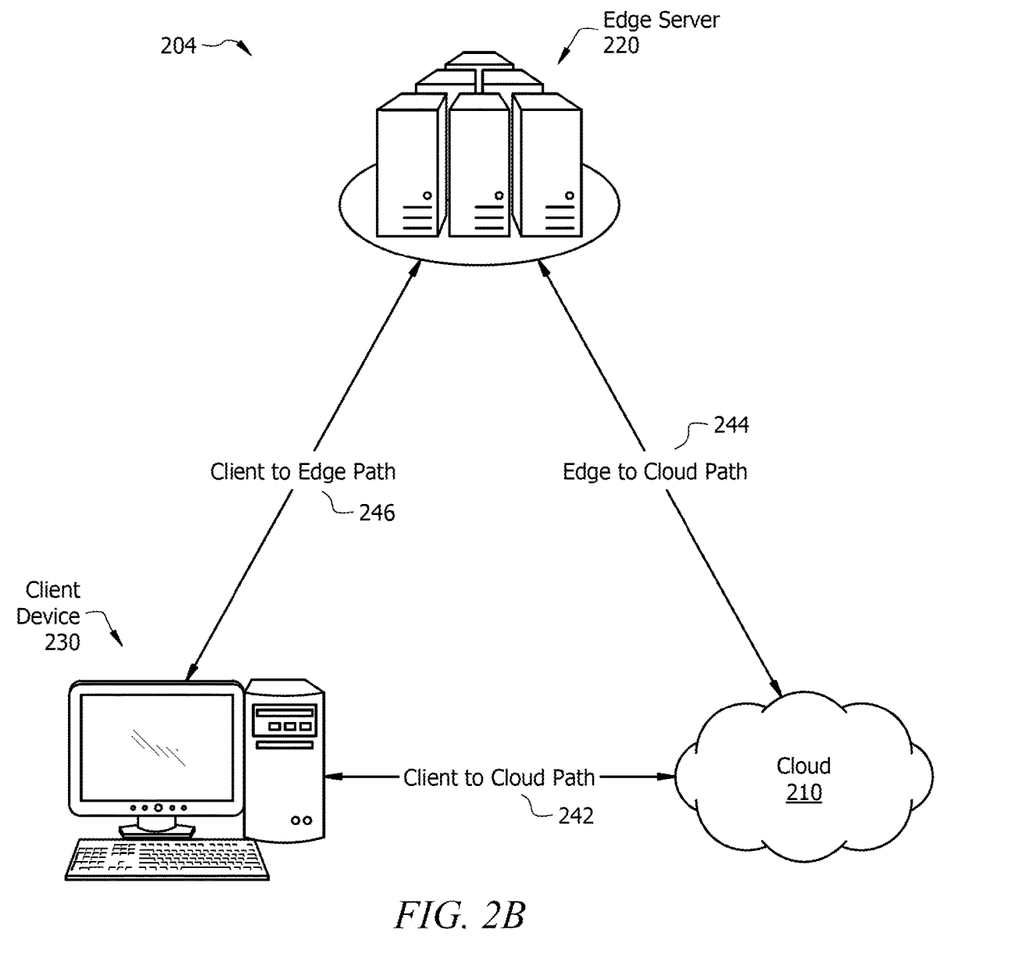

FIG. 2B shows a system 204 that includes communication paths (242-246) between all three components (client device 230, cloud server 210, and edge server 220). Once the client device 230 is communicating with the cloud server 210 using the direct client to cloud path 242, one or more components of the system, such as a control plane of the application or other management control system, may determine that the communication between the client device 230 and cloud server 210 should be migrated. When this occurs, the client device 230 sends a signal to the edge server 220 via a client to edge path 246. The client to edge path 246 allows the client device 230 to communicate directly with the edge server 220 and may be pre-existing or may be established once the migration is initiated. The client to edge path 246 may use a similar network connection to that used by the client to cloud path 242, as described above. While in general the client to edge path 246 may not have as much bandwidth and/or have higher latency than the edge to cloud path 244, because the edge server 220 is usually located nearer to the client device 230, the client to edge path 246, in combination with edge to cloud path 244, may have higher performance than the direct client to cloud path 242.

In one or more embodiments, the client device 230 signals the edge server 220 requesting an establishment of a new communication path between the client device 230 and the cloud server 210 through the edge server 220. This signal may be sent from the client device 230 to the edge server 220 via client to edge path 246. Once the edge server 220 receives this signal, it may forward the signal to the cloud server 210 via the edge to cloud path 244. Alternatively, or additionally, the edge server 220 may send a different signal to the cloud server 210, which includes information derived from the signal received from the client device 230, as well as information such as prefixes related to the edge server 220.

When the edge to cloud path 244 does not already exists as a result of receiving the signal from the client device 230, the edge server 220 may establish the edge to cloud path 244 as a second connection. Similarly, the edge server 220 may establish the client to edge path 246 after receiving a signal from the either the cloud server 210 or client device 230 requesting communication between the client device and the edge server in order to facilitate the migration or for other communication purposes.

Once both the client to edge path 246 and edge to cloud path 244 are established, a control plane associated with the application and hosted by the edge server may then establish a new communication path between the cloud server and the client device, with the edge server 220 acting as a relay. Alternatively, the cloud server may continue to host the control plane, and the control plane located on the cloud server may cause the establishment of the new communication path. Establishing the new communication path may be triggered by other modules, besides the control plane, located on the edge server or any other component of the system 204 without departing from the disclosure.

Once this new communication path is established, it may be verified by sending acknowledgments or other types of messages between the cloud server 210 and the client device 230 using the new communication path via edge to cloud path 244 and client to edge path 246. If an acknowledgment is received, then the communication is migrated to the new communication path from the direct path.

Figure 2C:
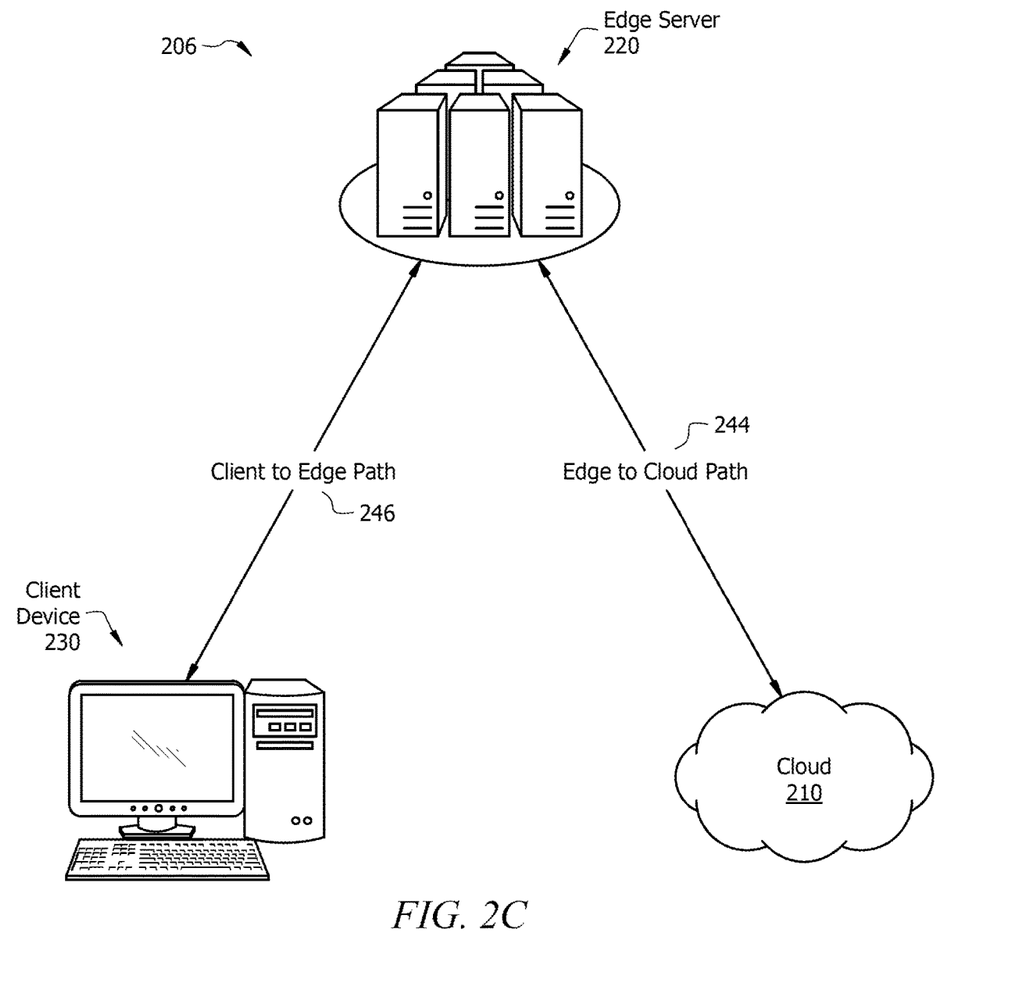

As shown in FIG. 2C, the system 206 shows an optional configuration after the migration described above with regards to FIGS. 2A and 2B, where the client to cloud path 242 is no longer necessary. In one or more embodiments, as shown in FIG. 2C, once the migration is complete, the client to cloud path 242 is eliminated, and only the edge to cloud path 244 and client to edge path 246 continue to function for communicating between the client device 230 and an application and/or resources hosted by the cloud server 210.

Alternatively, the application or other resources may be moved or hosted by the edge server 220, and the cloud server 210 will only need to provide those resources still located on it. For example, in a non-limiting example, a video streaming application may be hosted by the edge server while the actual video data is stored on the cloud server 210. Data from the cloud server may only be needed when a client device 230 requests a different video. In another example, edge server 220 may host three or four client devices 230 that are using chat rooms in a teleconference system. While they talk only to each other, no communication with the cloud server is needed. However, when an additional participant located in another location connects to them, the cloud server may provide the data related to the teleconference by forwarding it through the edge to cloud path 244, the edge server 220 to the client device via the client device to edge path 246 and back over the same paths. Other combinations of communications over the client device to edge path 246 and edge to cloud path 244 may be used without departing from the disclosure and, in general, the systems 202-206 described in FIGS. 2A, 2B, and 2C are exemplary only of possible configurations of the client device 230, edge server 220 and cloud server 210.

Figure 3:
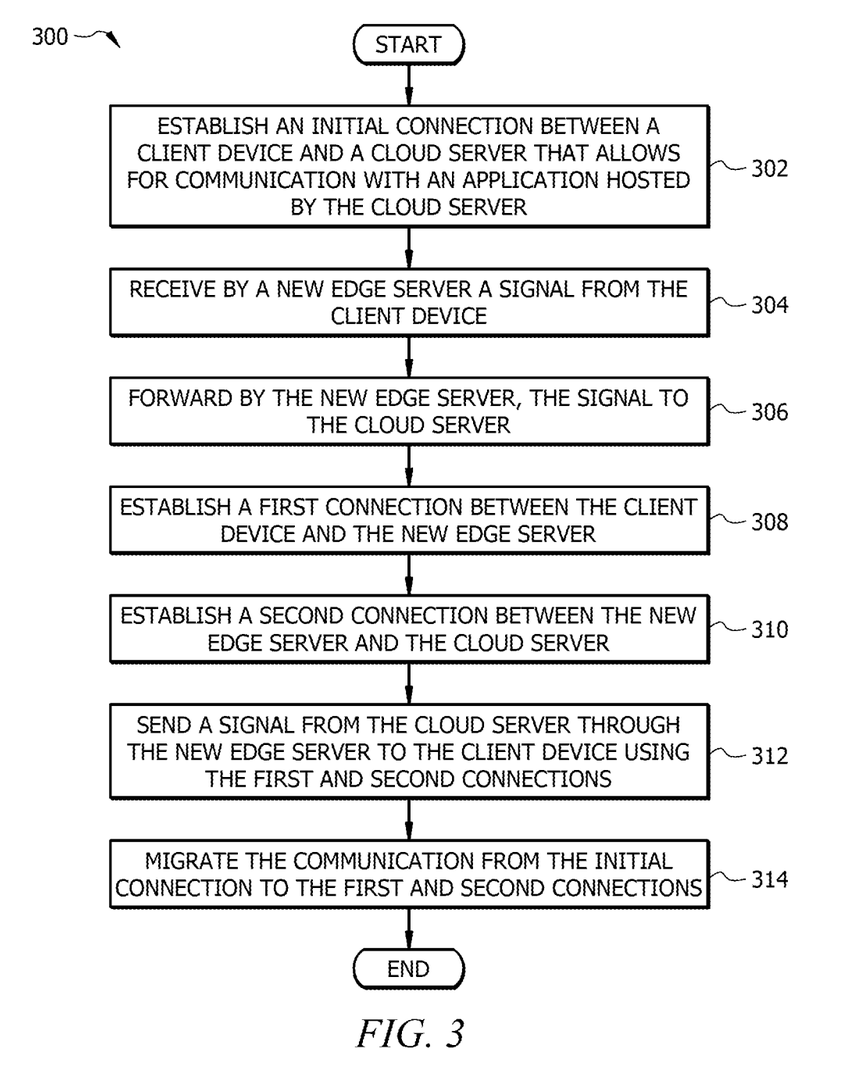
FIG. 3 illustrates a flow diagram of an example method for migrating communication between a client device and a cloud server to an edge server in accordance with at least one embodiment.

FIG. 3 illustrates an exemplary method 300 for associating a client device with an edge server in accordance with one or more embodiments. The method may be performed by the components described above with regards to any of FIGS. 1, 2A, 2B, and 2C, or may be performed with different systems and components.

At step 302, in one or more embodiments, an initial connection between a client device and a cloud server is established. This allows for communication between the client device and an application hosted by the cloud server. Alternatively, the initial connection may have already been established or a previous relay has been previously established using a second edge server, and the method may then begin with step 304.

Once a connection has been formed between the client device and the cloud server in step 302 or as previously established in a different way, step 304 is performed. In step 304, a new edge server receives a signal from the client device. This signal may request the establishment of a new communication path to the cloud server through the edge server. Alternatively, or additionally, the new signal may indicate the availability of the client's prefixes, such as the IP addresses associated with the client device, to the edge server. Other data or messages may be included in the signal sent from the client device to the edges server without departing from the disclosure.

Once the signal is received by the new edge server in step 304, the signal is then forwarded by the new edge server to the cloud server. This may be done over a pre-existing connection between the new edge server and the cloud server, or it may be done over the Internet, other networking system, and/or over a new connection. The signal may additionally include the edge server's prefixes or other data needed for establishing the new communication path.

Once the cloud server receives the signal in step 306, or alternatively, either during or before receiving the signal in step 306, a first connection between the client device and the new edge server is established in step 308, and a second connection between the edge server and the cloud server is established in step 310. The connections established in steps 308 and 310 allow the client device to communicate with the edge server and then with the cloud server through the edge server.

Once the first and second connection are established in steps 308 and 310, the method proceeds to step 312. In step 312, a signal is sent from the cloud server through the new edge server to the client device using the first and second connections. This signal may be from a control plane hosted by the edge device and associated with the application or from a different source, such as, but not limited to, an API gateway, a network-based controller, or a routing system. The signal may comprise of a command to migrate the communication between the client device and the cloud server from a prior communication path (such as the direct communication path or a previous path that uses a second or prior edge server as a relay) to the new communication path as was established in at least steps 308 and 310.

Once the signal is received by the client device and appropriate acknowledgements are received by both the edge server and the cloud server, the communication from the initial connection may be migrated in step 314 to the new connection using the first and second connections established in steps 308 and 310. After step 314, the method may end.

Figure 4:
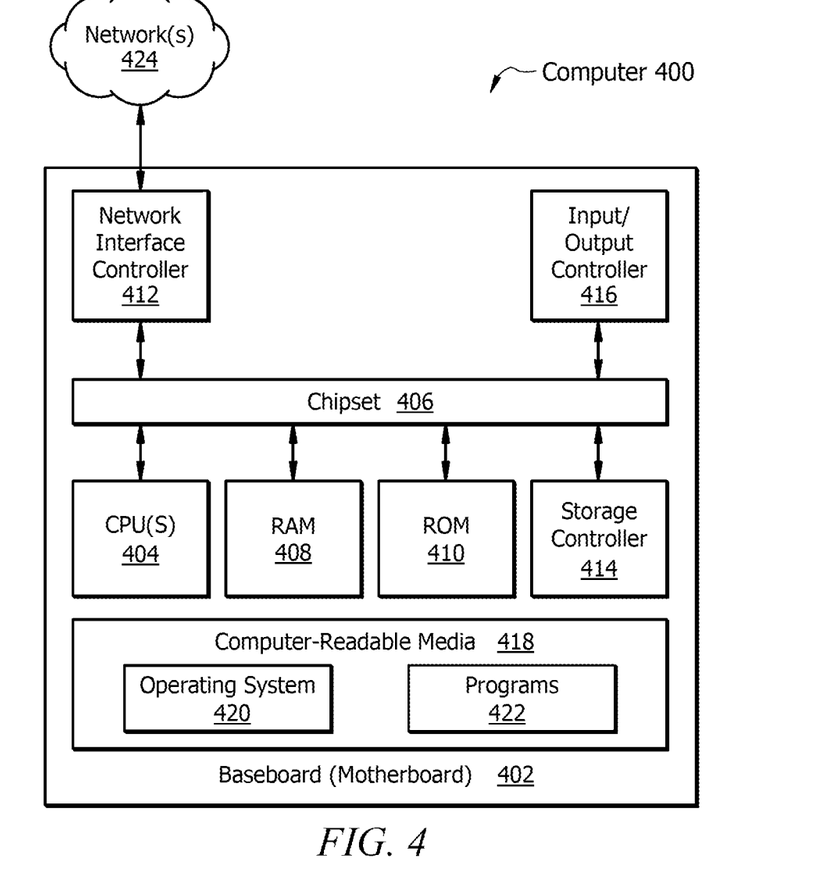
FIG. 4 illustrates a computer architecture diagram shown in an illustrative computer hardware architecture in accordance with at least one embodiment.

FIG. 4 shows an example computer architecture for a device capable of executing program components for implementing the functionality described above. The computer architecture shown in FIG. 4 illustrates any type of computer 400, such as a conventional server computer, workstation, desktop computer, laptop, tablet, network appliance, e-reader, smartphone, or other computing device, and may be utilized to execute any of the software components presented herein. In some examples, the computer 400, may, correspond to any of the devices such as the edge servers 122 and client devices 124 as well as components of the cloud servers 110A-110N as shown in FIG. 1, and/or any other device described herein, and may comprise personal devices (e.g., smartphones, tables, wearable devices, and laptop devices), networked devices such as servers, switches, routers, hubs, bridges, gateways, modems, repeaters, access points, and/or any other type of computing device that may be running any type of software and/or virtualization technology.

The computer 400 includes a baseboard 402, or "motherboard," which is a printed circuit board to which a multitude of components or devices may be connected by way of a system bus or other electrical communication paths. In one illustrative configuration, one or more central processing units ("CPUs") 404 operate in conjunction with a chipset 406. The CPUs 404 may be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the state of one or more other switching elements, such as logic gateway. These basic switching elements may be combined to create more complex logic circuits including registers, adders-subtractors, arithmetic logic units, floating-point units, and the like.

The chipset 406 provides an interface between the CPUs 404 and the remainder of the components and devices on the baseboard 402. The chipset 406 may provide an interface to a RAM 408, which is used as the main memory in the computer 400. The chipset 406 may further provide an interface to a computer-readable storage medium, such as a read-only memory ("ROM") 410 or non-volatile RAM ("NVRAM"), for storing basic routines that help to startup the computer 400 and to transfer information between the various components and devices. The ROM 410 or NVRAM may also store other software components necessary for the operation of the computer 400 in accordance with the configurations described herein.

The computer 400 may operate in a networked environment using logical connection to remote computing devices and computer systems through a network, such as the network 130 shown in FIG. 1. The chipset 406 may include functionality for providing network connectivity through a network interface (NIC) 412, such as a gigabit Ethernet adapter. The NIC 412 may connect the computer 400 to other computing devices over the network 424. It should be appreciated that multiple NICs 412 may be present in the computer 400, connecting the computer to other types of networks and remote computer systems.

The computer 400 may be connected to computer-readable media 418 or other forms of storage devices that provide non-volatile storage for the computer 400. The computer-readable media 418 may store an operating system 420, programs 422, and other data. The computer-readable media 418 may be connected to the computer 400 through a storage controller 414 connected to the chipset 406. The computer-readable media 418 may consist of one or more physical storage units. The storage controller 414 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 may store data on the computer-readable media 418 by transforming the physical state of the physical storage units to reflect the information being stored. The specific transformation of the physical state may depend on various factors in different embodiments of this description. Examples of such factors may include, but are not limited to, the technology used to implement the physical storage units, whether the storage device is characterized as primary or secondary storage, and the like.

For example, the computer 400 may store information to the computer readable media 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete components in a solid-state storage unit. Other transformations of physical media are possible without departing from the scope and spirit of the present description with the foregoing examples provided only to facilitate this description. The computer 400 may further read information from the computer readable media 418 by detecting the physical states or characteristics of one or more locations within the physical storage units.

In addition to the computer-readable media 418 described above, the computer 400 may have access to other computer-readable storage media to store and retrieve information, such as program modules, data structures, or other data. It should be appreciated by those skilled in the art that computer-readable storage media is any available media that provides for the non-transitory storage of data and which may be accessed by the computer 400. In some examples, the operations performed by the client device (e.g., FIG. 1, 124), edge server (e.g., FIG. 1, 122), and or any components included therein, may be supported by one or more devices similar to computer 400. Unless stated otherwise, some or all the operations performed by the API gateway, and or any components included therein, may be performed by one or more computers 400.

By way of example and not limitation, computer-readable storage media may include volatile and non-volatile, removable, and non-removable media implemented in a method or technology. Computer-readable storage media includes, but is not limited to, RAM, ROM, erasable programmable ROM ("EPROM"), electrically-erasable programmable ROM ("EEPROM"), flash memory, or other solid-state memory technology compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices, or any other medium that may be used to store the desired information in a non-transitory fashion.

As mentioned briefly above, the computer-readable media 418 may store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX operating system or one of its variants. It should be appreciated that other operating systems may also be utilized. The computer-readable media 418 may store other system or application programs and data utilized by computer 400.

In one embodiment, the computer-readable media 418 or other computer-readable storage media is encoded with computer-executable instructions which, when loaded into the computer 400, transform the computer from a general-purpose computing system into a special-purpose computer capable of implementing the embodiments described herein. These computer executable instructions transform the computer 400 by specifying how the CPUs 404 transition between states, as described above. According to one embodiment, the computer 400 has access to computer-readable storage media storing computer-executable instructions which when executed by the computer 400, perform the various processes described above with regards to FIGS. 1, 2A, 2B, 2C, and 3. The computer 400 may also include computer-readable storage media with instructions stored thereupon for performing any of the other computer implemented operations described herein.

The computer 400 may also include one or more input/output controllers 416 for receiving and processing input from several input devices, such as a keyboard, a mouse, a touchpad, a touch screen, an electronic stylus, or other type of input device. Similarly, an input/output controller 416 may provide output to a display such as a computer monitor, a flat panel display, a digital projector, a printer, or another type of output device. It will be appreciated that the computer 400 may not include all the components shown in FIG. 1, may include other components that are not explicitly shown in FIG. 1, or may utilize an architecture completely different than that shown in FIG. 1.

The computer 400 may include one or more hardware processors 404 (CPUs) configured to execute one or more stored instructions. The processor(s) 404 may comprise one or more cores. Further, the computer 400 may include one or more network interfaces 412 configured to provide communications between the computer 400 and other devices. The network interface may include devices configured to couple to personal area networks (PANs), wired and wireless local area networks (LANs), wired and wireless wide area networks (WANs), and so forth. For example, the network interfaces may include devices compatible with Ethernet, WI-FI™, and so forth.

While the disclosure is described with respect to the specific examples, it is to be understood that the scope of the disclosure is not limited to these specific examples. Since other modifications and changes varied to fit particular operating requirements and environments will be apparent to those skilled in the art, the disclosure is not considered limited to the example chosen for purposes of disclosure and covers changes and modifications which do not constitute departures from the true spirit and scope of this disclosure.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed:

1. A method for migrating a communication between a client device and an application hosted by a cloud server, comprising:

receiving, by an edge server, a signal from the client device requesting an establishment of a new communication path between the client device and the cloud server through the edge server;

forwarding, by the edge server, the signal to the cloud server;

establishing, by the edge server, a first connection between the client device and the edge server;

establishing, by the edge server, a second connection between the edge server and the cloud server;

establishing, by a control plane of the edge server, the new communication path between the cloud server and the client device using the first connection and the second connection, wherein the control plane is associated with the application;

migrating the communication to the new communication path;

moving, while migrating the communication to the new communication path, the application from the cloud server to the edge server; and providing the application from the edge server to the client device through the first connection.

2. The method of claim 1, wherein the cloud server continues to host the application after the new communication path is established.

3. The method of claim 1, wherein prior to migrating the communication, the communication between the client device and the application uses a prior communication path between the client device and the cloud server.

4. The method of claim 3, wherein the prior communication path uses a direct connection between the client device and the cloud server.

5. The method of claim 3, wherein the prior communication path uses a second edge server for communicating between the client device and the cloud server.

6. The method of claim 1, wherein after migrating the communication, the cloud server communicates with the client device using the new communication path.

7. The method of claim 1, wherein prior to the edge server receiving the signal from the client device, the control plane sends the client device a command to migrate the communication between the client device and the cloud server from a prior communication path to the new communication path.

8. The method of claim 1, wherein the signal indicates an availability of prefixes associated with the client device.

9. The method of claim 1, wherein the communication between the client device and the application is not interrupted while establishing the new communication path.

10. A system, comprising:

a client device that uses an application;

a cloud server which hosts the application; and an edge server that comprises:

one or more processors; and one or more computer-readable non-transitory storage media coupled to the one or more processors that stores instructions operable when executed by the one or more processors to cause the system to perform a method comprising:

receiving, by the edge server, a signal from the client device requesting an establishment of a new communication path between the client device and the cloud server through the edge server;

forwarding, by the edge server, the signal to the cloud server;

establishing, by the edge server, a first connection between the client device and the edge server;

establishing, by the edge server, a second connection between the edge server and the cloud server;

establishing, by a control plane of the edge server, the new communication path between the cloud server and the client device using the first connection and the second connection, wherein the control plane is associated with the application;

migrating a communication to the new communication path;

moving, while migrating the communication to the new communication path, the application from the cloud server to the edge server; and providing the application from the edge server to the client device through the first connection.

11. The system of claim 10, wherein the cloud server continues to host the application after the new communication path is established.

12. The system of claim 10, wherein prior to migrating the communication, the communication between the client device and the application uses a prior communication path between the client device and the cloud server.

13. The system of claim 12, wherein the prior communication path uses a direct connection between the client device and the cloud server.

14. The system of claim 12, wherein the prior communication path uses a second edge server for communicating between the client device and the cloud server.

15. The system of claim 10, wherein after migrating the communication, the cloud server communicates with the client device using the new communication path.

16. The system of claim 10, wherein prior to the edge server receiving the signal from the client device, the control plane sends the client device a command to migrate the communication between the client device and the cloud server from a prior communication path to the new communication path.

17. The system of claim 10, wherein the signal indicates an availability of prefixes associated with the client device.

18. The system of claim 10, wherein the communication between the client device and the application is not interrupted while establishing the new communication path.

19. The system of claim 10, wherein the edge server is located at a different geographical location than the cloud server.

20. At least one non-transitory computer-readable storage medium having stored therein instructions which, when executed by one or more processors, cause the one or more processors to:

receive, by an edge server, a signal from a client device requesting an establishment of a new communication path between the client device and a cloud server through the edge server;

forward, by the edge server, the signal to the cloud server;

establish, by the edge server, a first connection between the client device and the edge server;

establish a second connection between the edge server and the cloud server;

establish, by a control plane of the edge server, the new communication path between the cloud server and the client device using the first connection and the second connection, wherein the control plane is associated with an application;

migrate communication to the new communication path;

moving, while migrating the communication to the new communication path, the application from the cloud server to the edge server; and provide the application from the edge server to the client device through the first connection.

\* \* \* \* \*